April 10, 1945.  L. MALICAY  2,373,584
COCOANUT CUTTING MACHINE
Filed Sept. 23, 1943  4 Sheets-Sheet 1
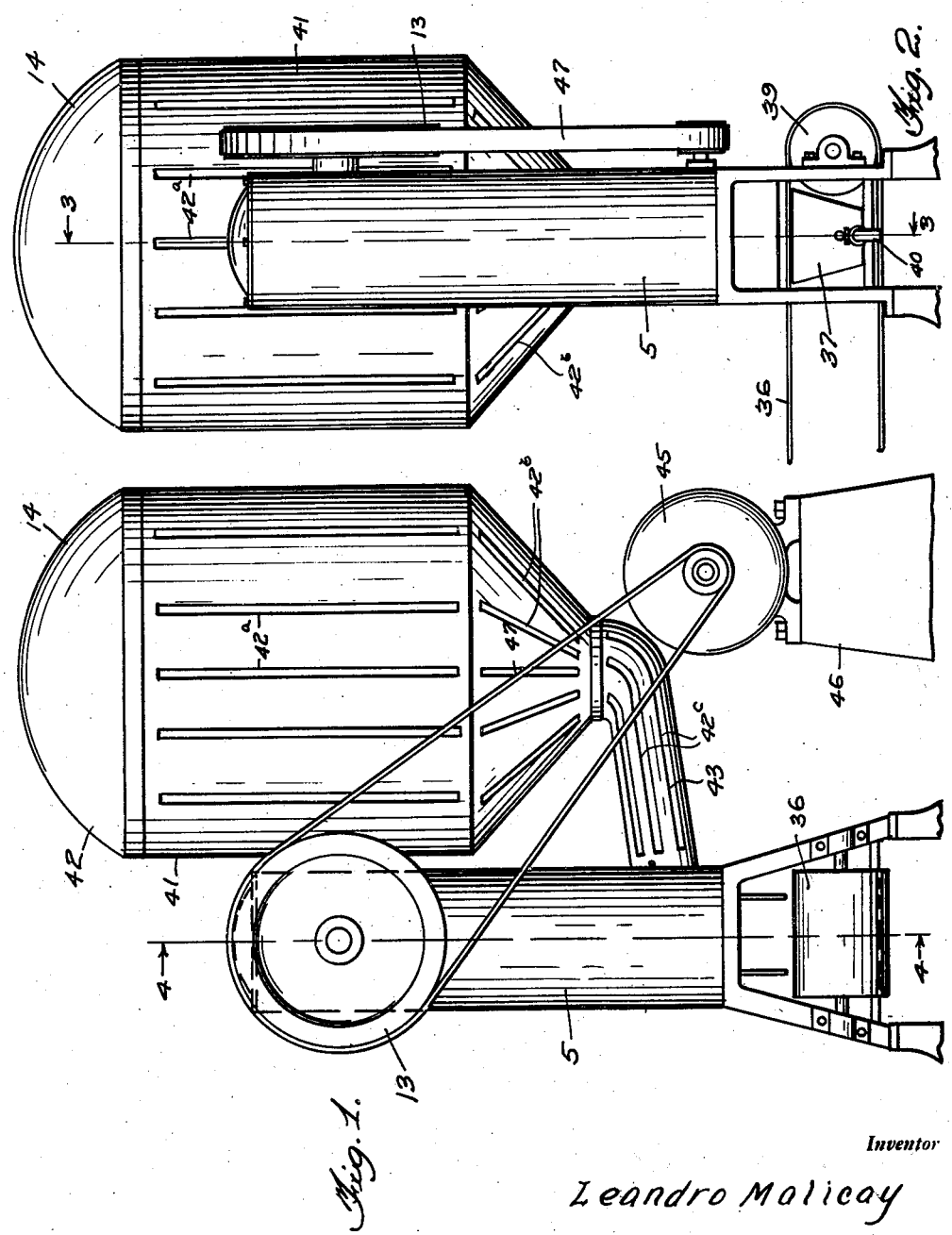
Inventor
Leandro Malicay
By Clarence A. O'Brien
and Harvey B. Jacobson
Attorneys

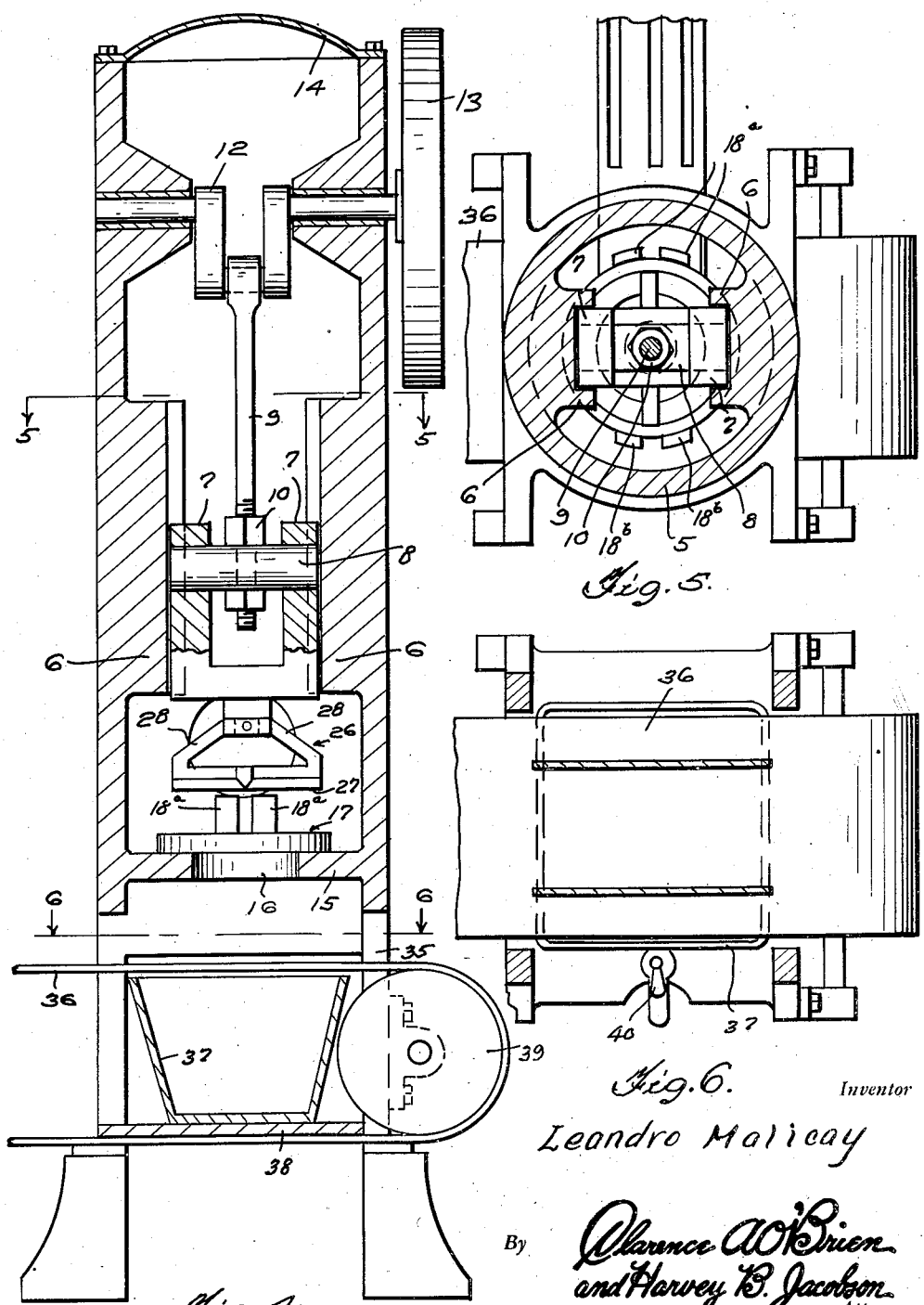

April 10, 1945.                L. MALICAY                2,373,584
                        COCOANUT CUTTING MACHINE
                    Filed Sept. 23, 1943        4 Sheets-Sheet 4

Inventor
Leandro Malicay

By Clarence A. O'Brien
and Harvey B. Jacobson
Attorneys

Patented Apr. 10, 1945

2,373,584

UNITED STATES PATENT OFFICE 2,373,584

COCONUT CUTTING MACHINE

Leandro Malicay, Los Angeles, Calif.

Application September 23, 1943, Serial No. 503,554

4 Claims. (Cl. 146—7)

The present invention appertains to new and useful improvements in cutting machines and more particularly to a machine especially adapted for cutting coconuts with a view toward preparing the meat thereof in producing copra.

An important object of the present invention is to provide a machine for cutting one coconut immediately after the other, to the end that one machine can cut coconuts rapidly to supply a number of workmen who have the job of removing the coconut meat with chisels or other implements preparatory to drying the same.

Another important object of the invention is to provide a coconut cutting machine wherein the fruit is fed by gravity and wherein at all times the line of coconuts is visible to the end that defects, or binding of the fruit in the machine can readily be detected.

Various other important objects and advantages of the invention will become apparent to the reader of the following description.

In the drawings:

Figure 1 is a side elevational view of the machine.

Figure 2 is a front elevational view of the machine.

Figure 4 is an enlarged vertical sectional view taken on the line 4—4 of Figure 1.

Figure 5 is a horizontal sectional view taken on the line 5—5 of Figure 4.

Figure 6 is a section taken on the line 6—6 of Figure 4.

Figure 3:
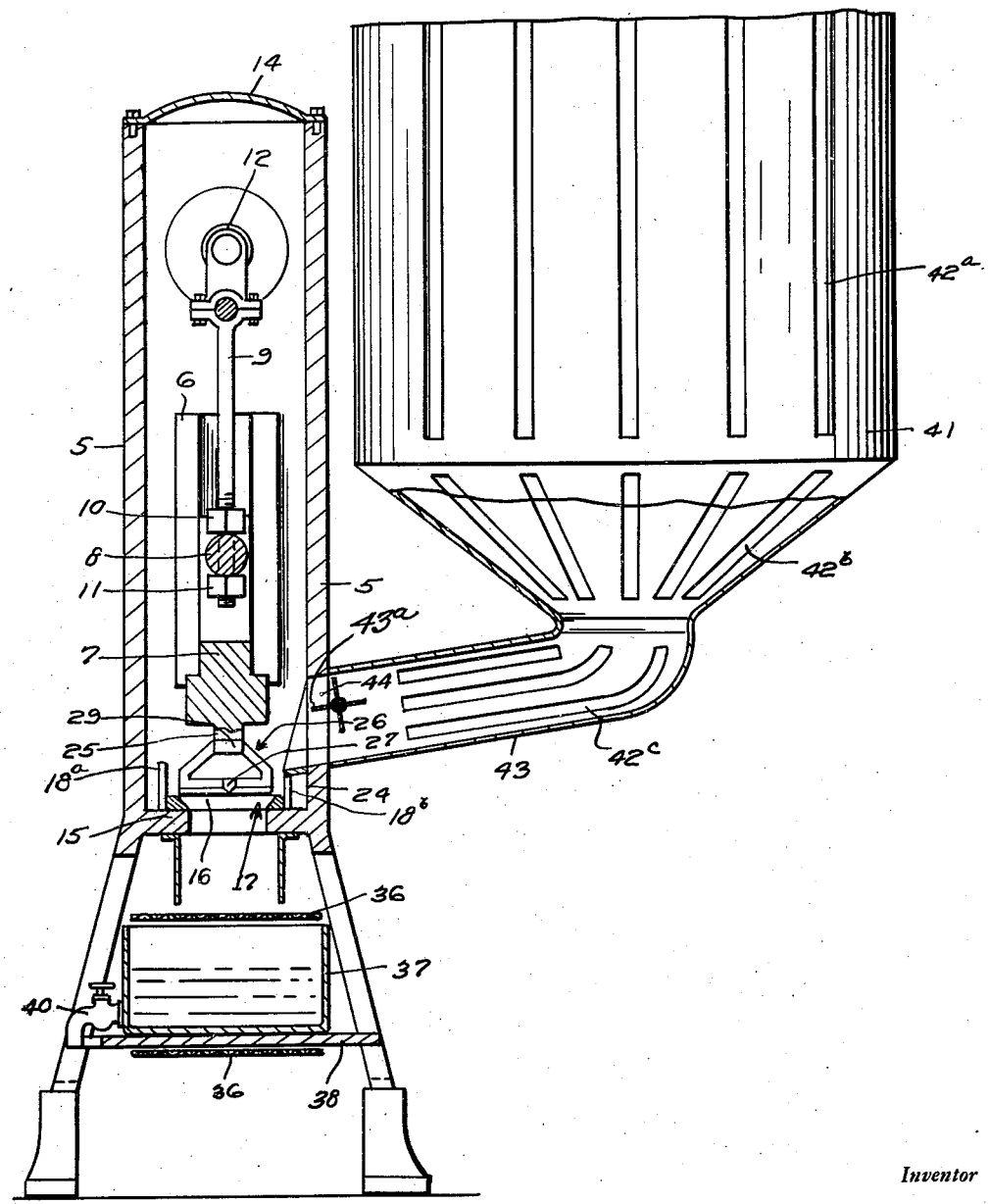
Figure 3 is a fragmentary vertical sectional view taken on the line 3—3 of Figure 2.
Figure 7:
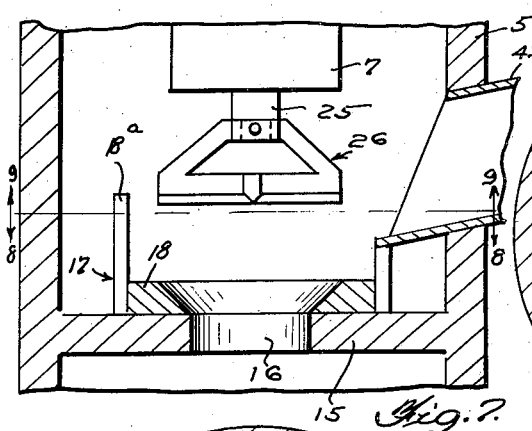
Figure 7 is a fragmentary vertical sectional view through the lower portion of the machine.
Figure 8:
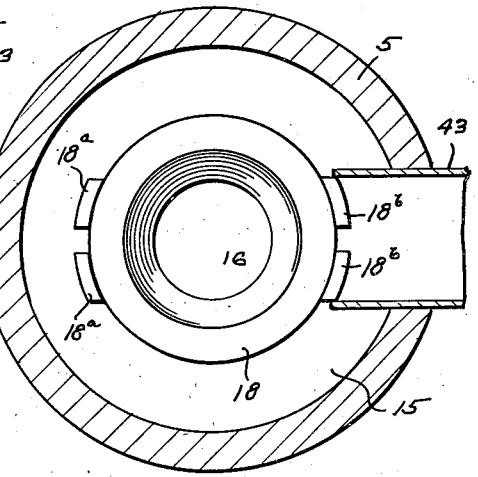
Figure 8 is a sectional view taken substantially on the sectional line shown in Figure 7 looking in the direction of the arrows marked 8.
Figure 9:
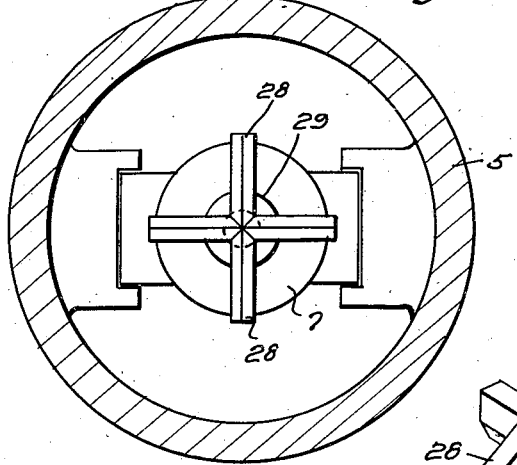
Figure 9 is a sectional view taken on the section line of Figure 7 looking in the direction of the arrows represented by numeral 9.
Figure 10:
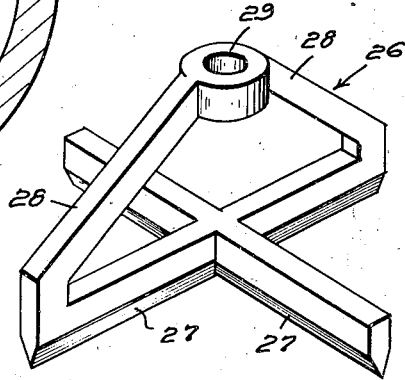
Figure 10 is a perspective view of the cutter.

Referring to the drawings wherein like numerals designate like parts, it can be seen that numeral 5 denotes a vertically disposed barrel having a crosshead assembly therein. This crosshead assembly consists of a pair of vertically disposed and opposed guide formations 6, 6 each grooved to receive side portions of a U-shaped slide 7 between the leg portions of which is a wrist pin 8 through which a connecting rod 9 is disposed. This end portion of the connecting rod is threaded and has a pair of nuts 10, 11 thereon for definitely securing the rod to the wrist pin 8.

Within the upper portion of the barrel 5 is a crank shaft 12, the connecting rod 9 being connected thereto. This shaft extends exteriorly of the upper portion of the barrel 5 and has a pulley wheel 13. A removable cap 14 may be provided for the upper end of the barrel.

At a point below the crosshead guides 6, 6 is a floor 15 having a discharge opening 16 therein. Upon this floor 15 is mounted a foundation 17, preferably in the form of an annulus 18, having its inner edge beveled. This foundation has a pair of short risers 18b and a pair of higher risers or guards 18a against which coconuts can strike and be guided to seat on the foundation 17.

As can be seen in the drawings, the slide 7 has a depending shank 25 and to this is secured a cutter 26. This cutter comprises a pair of crossed blades 27, 27, from the opposite ends of one of which, inclined bars 28, 28 connect the blade to a collar 29, which collar is disposed over the shank 25 and secured in place by set screw or other suitable means.

Opposite side portions of the lower portion of the barrel 5 are open, as at 35, to accommodate a conveyor web 36 which passes over a coconut liquid catching receptacle 37 located on a platform 38. The web 36 passes over a roller 39 supported by the lower portion of the barrel 5. Obviously, the web 36 is sufficiently porous so that coconuts cut and forced through the foundation 17 will fall upon and be carried by the web 36, while juices from the cut fruit will sieve into the part 37, and when desired, this part can be drained through a faucet 40.

Numeral 41 denotes a hopper having a removable top 42 and inclined from the bottom of this hopper is a chute 43 which connects to the barrel 5 at an opening 44 therein. As shown in Figure 1, an electric motor 45 is mounted upon a suitable support 46 and drives by belt 47 the pulley wheel 13. This of course operates the crosshead and the tool carried thereby for cutting the coconut fruit against the foundation 17.

As can be seen in the drawings, the hopper 41 is formed with vertical slots 42a so that the amount of coconuts therein can always be readily ascertained. It is also preferable that the bottom of the hopper be likewise formed with slots 42b and that the chute 43 be formed with slots 42c. This will allow any binding of the fruit to be quickly corrected and at all times afford an observer the knowledge of how many fruits are still left in the machine.

Obviously as fruit gravitates from the hopper 41 through the chute 43, it will leave the lower end of the chute 43 and strike against the guards 18a with the result that it will be thereby caused to properly seat on the foundation 17.

It is preferable that some form of coconut feed regulator such as is generally referred to by reference character 43a be employed so that the coconuts will not crowd under the cutter.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A coconut cutting machine comprising a cylinder disposed upright and open at its bottom, an annular nut holder about the open bottom of said cylinder, tracks extending vertically along walls of said cylinder, a crankshaft rotatably mounted through said cylinder above said tracks, a carrier in said cylinder slidable vertically therein along said tracks and having a shank at its lower end, a rod pivoted to the crankshaft and extending downwardly therefrom and connected with said carrier for imparting reciprocating movement to the carrier as the crankshaft turns, a receptacle for a supply of coconuts having an outlet pipe leaving from its bottom and into said cylinder between said track and said annular nut carrier, arms extending upwardy from the annular nut carrier at the opposite side thereof from said pipe for centering an incoming nut upon the annular nut carrier, and a cutter carried by said shank for a nut, and a cutter carried by said shank for operating upon cutting a nut.

2. A coconut cutting machine comprising a vertically disposed cylindrical casing having a discharge opening at its bottom, a ring about the discharge opening constituting a seat for a nut, a receptacle for a supply of nuts having an outlet pipe at its bottom entering the casing through a side thereof at a point adjacent said ring, arms extending upwardly from said ring, a pair of said arms being disposed at opposite sides of the inner end of the feed pipe and another pair being disposed at the opposite side of the ring from the first pair and of greater height, said arms serving to engage an incoming nut and retain the nut in position upon the ring, a blade carrier mounted for reciprocating movement vertically in said casing toward and away from said ring, means for imparting reciprocating movement to said blade carrier, and blades carried by said blade carrier for engaging a nut upon the ring as the carrier moves downwardly and cutting the nut.

3. A coconut cutting machine comprising a casing having a discharge opening at its bottom, supporting legs extending downwardly from said casing, a platform carried by said legs, a juice receptacle upon said platform, a conveyor of porous material extending horizontally between the legs of said casing and having upper and lower flights between which the platform and the juice receptacle are located, a ring in said casing about the discharge opening thereof, a receptacle for a supply of nuts having an outlet pipe at its bottom entering the lower portion of the casing through a side thereof for discharge of nuts onto said ring, a carrier mounted for vertical reciprocating movement in said casing, means for reciprocating said carrier, and blades carried by said carrier for operating upon and cutting a nut on the ring as the carrier moves downwardly.

4. A coconut cutting machine comprising a casing having a discharge opening at its bottom, a ring about the discharge opening within the casing, said casing having an inlet in one side of its lower portion whereby nuts may enter the casing and rest upon said ring, tracks extending vertically in said casing along opposite wall portions thereof, a block slidable vertically in said casing along said tracks, a shank extending downwardly from said block, a wrist pin carried by said block, a crank-shaft extending transversely through the casing and rotatably mounted, a rod connecting the crank of said shaft with said wrist pin for reciprocating the block as the crankshaft turns, and a cutter carried by said shank and having blades extending horizontally and transversely of each other for engaging and cutting a nut as the block moves downwardly.

LEANDRO MALICAY.